(12) United States Patent  
Wang et al.

(10) Patent No.: US 7,460,550 B2  
(45) Date of Patent: Dec. 2, 2008

(54) STORAGE STRUCTURE AND METHOD UTILIZING MULTIPLE PROTOCOL PROCESSOR UNITS

(75) Inventors: Jun-Yao Wang, Tainan (TW); Chung-Ho Chen, Tainan (TW); Chao-Lin Su, Tainan (TW); Chao-Hsien Hsu, Shueishang Township, Chiayi County (TW); Cheng-Yeh Yu, Wufong Township, Taichung County (TW); I-Cheng Chung, Siyu Township, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 819 days.

(21) Appl. No.: 10/979,133

(22) Filed: Nov. 3, 2004

(65) Prior Publication Data

US 2005/0281286 A1    Dec. 22, 2005

(30) Foreign Application Priority Data

Jun. 21, 2004    (TW)    ............................. 93117927 A (51) Int. Cl.  
*H04L 12/26*    (2006.01)

(52) U.S. Cl. ...................................... 370/412; 370/465
(58) Field of Classification Search ................ 370/412, 370/465
See application file for complete search history.

(56) References Cited

U.S. PATENT DOCUMENTS

2006/0274789 A1* 12/2006 Pong ........................... 370/469

* cited by examiner

*Primary Examiner*—Melvin Marcelo  
(74) *Attorney, Agent, or Firm*—Bacon & Thomas, PLLC (57) ABSTRACT

A storage structure and method having multiple protocol processor units are disclosed. The storage structure comprises a host CPU, a main memory, a storage device, a switch fabric, and a host bus adapter module. The host bus adapter module includes a plurality of protocol processor nodes for processing frames received from a network, and storing those frames into the storage device. A processing module of the host bus adapter module extracts the session information of each frame and compares it with entries recorded in a look-up table. If the connection information hits one entry of the look-up table, the frame can be bypassed into a corresponding protocol processor node according to the definition of the look-up table. Otherwise, a new entry will be inserted into the look-up table for designating a corresponding protocol processor node.

24 Claims, 7 Drawing Sheets

| Entry NO. | Source IP | Destination IP | Source TCP port | Destination TCP port | PPN NO. |
|---|---|---|---|---|---|
| 1 | ... | ... | ... | ... | ... |
| 2 | ... | ... | ... | ... | ... |
| ... | ... | ... | ... | ... | ... |

STORAGE STRUCTURE AND METHOD UTILIZING MULTIPLE PROTOCOL PROCESSOR UNITS

BACKGROUND OF THE INVENTION

1. Field of the Invention

The present invention relates to a storage structure and method utilizing multiple protocol processor units and, more particularly, to a storage structure and method having multiple protocol processor units for a host bus adapter (HBA) of an internet small computer system interface (iSCSI).

2. Description of the Related Art

With improvements in the field of information technology, people are requiring with increasing frequency information devices; as a result, data storage requirements are also increasing, and consequently research into storage devices and related storage technologies are gaining importance. Data storage technologies include data storage methods, data management technologies, and connectivity technologies between the storage devices. Well known prior art storage technologies include redundant arrays of independent disks (RAID), network attached storage (NAS), small computer system interface (SCSI), storage area network (SAN), or fiber channel. A RAID is composed of a disk with a SCSI interface and a RAID control means. A NAS is a network storage apparatus composed of a SCSI disk or RAID disk array and a transmission protocol that takes files as a unit. The above-mentioned transmission protocol can be a network file system (NFS), or a common Internet file system (CIFS).

Since the Internet has become very important for people, network storage devices are getting more and more popular. The typical storage network is a network that connects a storage device to a server, and compared to technologies that directly connect the server and the storage devices together, such as a traditional RAID or SCSI connection, the storage network has higher transmission efficiencies, extensibility and reliability. Accordingly, a prior art internet small computer system interface (iSCSI) transmission protocol sends SCSI commands and data on an IP network using an iSCSI protocol data unit (PDU), and so the iSCSI protocol provides the IP network with storage network functionalities.

A user needs only to change the interface of the server and the storage device to an iSCSI interface to use an original IP network switching apparatus to establish a storage network. The current storage network transmission structure has two methods for increasing transmission speeds: one involves increasing the data processing speed of a protocol processing chip; another involves utilizing multiple protocol processing chips. The first method increases the transmission speed by enhancing the processing speed and has a simple structure. For example, the transmission speed of the chip of Ethernet physical layer increases from 1 GB/s (1 Gigabyte/second) to 10 GB/s (10 Gigabytes/second); however, this requires consideration of the design of the unit because not all designs are easy to modify so as to increase their speeds. Usually, more complicated units are more difficult to design for increased speeds, especially complicated protocol processing chips. Therefore, the first method is limited by acceleration limitations of the chip.

The other method utilizes multiple protocol processing chips to increase the transmission speed. The simple protocol processing unit, such as in the medium access control (MAC) layer or the physical (PHY) layer, can be designed by enhancing the processing speed. On the other hand, a complicated unit can be designed with multiple processing chips using, for example, transmission control protocol/internet protocol (TCP/IP) offload engines and iSCSI processors.

Therefore, it is desirable to provide a storage structure and method having multiple protocol processor units to mitigate and/or obviate the aforementioned problems.

SUMMARY OF THE INVENTION

A main objective of the present invention is to provide a storage structure and method having multiple protocol processor units that utilize characteristics of the iSCSI protocol to provide a structure having a plurality of protocol processor nodes (PPN) in a networked environment that increases a transmission speed of the host bus adapter (HBA) of an internet small computer system interface (iSCSI).

Another objective of the present invention is to provide a storage structure and method having multiple protocol processor units that utilizes a modularized design to connect other units via the switch fabric and a hardware look-up table to accelerate pre-process speed.

According to an aspect of the present invention, a storage structure having multiple protocol processor units comprises: a host CPU; a main memory; a host bus adapter module, a storage device and a switch fabric. The host bus adapter module includes a plurality of protocol processor nodes and a processing module. The plurality of protocol processor nodes are used for processing frames and commands contained in the connections established by at least one session, and the processing module comprises an input processing module, an output processing module and a processor, the input processing module capable of sending a frame sent from a network end to a corresponding protocol processor node for execution according to a look-up table, the output processing module capable of sending the frame sent from the protocol processor nodes to the network end. Furthermore, the storage device has at least one disk for storing data in the frame processed by the protocol processor nodes, and the switch fabric is a transform medium for the protocol processor nodes and the storage device, and for sending the data in the frame and command sent by the protocol processor nodes to the storage device for storage and execution.

According to an aspect, A storage method utilizing multiple protocol processor units comprises: a receiving step for receiving a frame and its command contained in a connection established by one session sent from a network end; an assigning step for sending the frame to a corresponding protocol processor node according to a look-up table; a storing step for storing the frame and the command transformed by a switch fabric into a storage device; and an outputting step for sending the frame sent by the protocol processor node to the network end.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
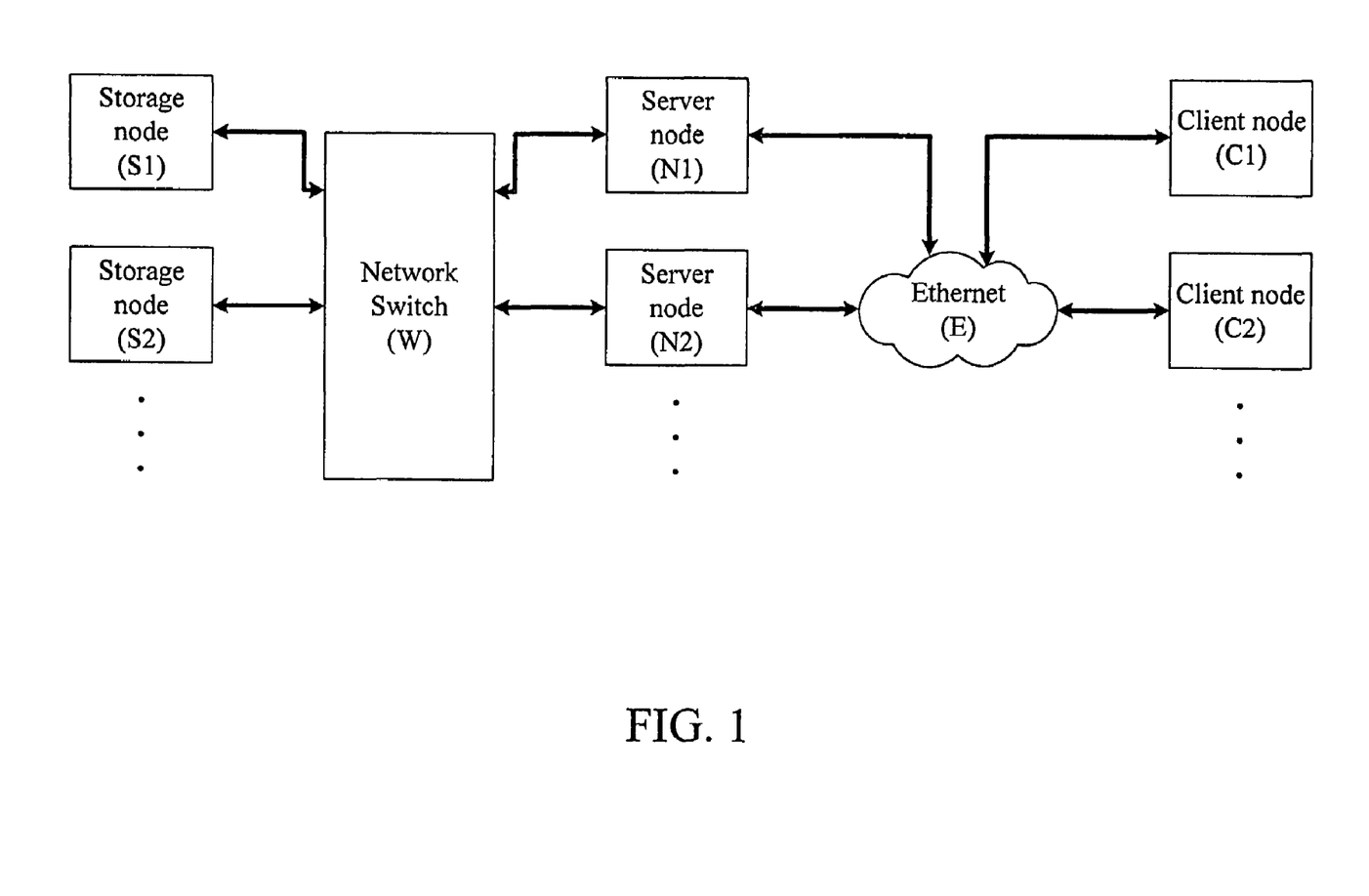
FIG. 1 is illustrates a storage network of an embodiment according to the present invention.

A storage structure having multiple protocol processor units utilizes a plurality of protocol processor nodes (PPN) to increase data transmission speeds. Please refer to FIG. 1. FIG. 1 illustrates a storage network of an embodiment according to the present invention. In an IP-based storage network, as shown in FIG. 1, when client nodes C1,C2 are connected to server nodes N1,N2 via an external network E, if there are any data packages that need to be stored, then under the internet small computer system interface (iSCSI) protocol, storage devices S1,S2 can provide one or more transmitting ports, and a network switch W transforms the data packages between the IP network and Ethernet E to store the data packages.

In order to increase data transmission speeds, it is necessary not only to increase the speed of the basic transmission unit but also to increase the capabilities of the protocol processors. Since the circuitry of the protocol processors is much more complicated than basic physical layer (PHY) and medium access control (MAC) layer, increasing the capabilities of the protocol processors is the key to improving system transmission speeds. Accordingly, this embodiment utilizes characteristics of the iSCSI protocol to establish a structure having a plurality of protocol processor nodes to increase transmission speeds of an iSCSI host bus adapter (HBA) to improve the functionalities of the iSCSI HBA, such as managing the iSCSI link, accepting iSCSI packages for decoding as SCSI commands, and packaging data as iSCSI packages.

Figure 2:
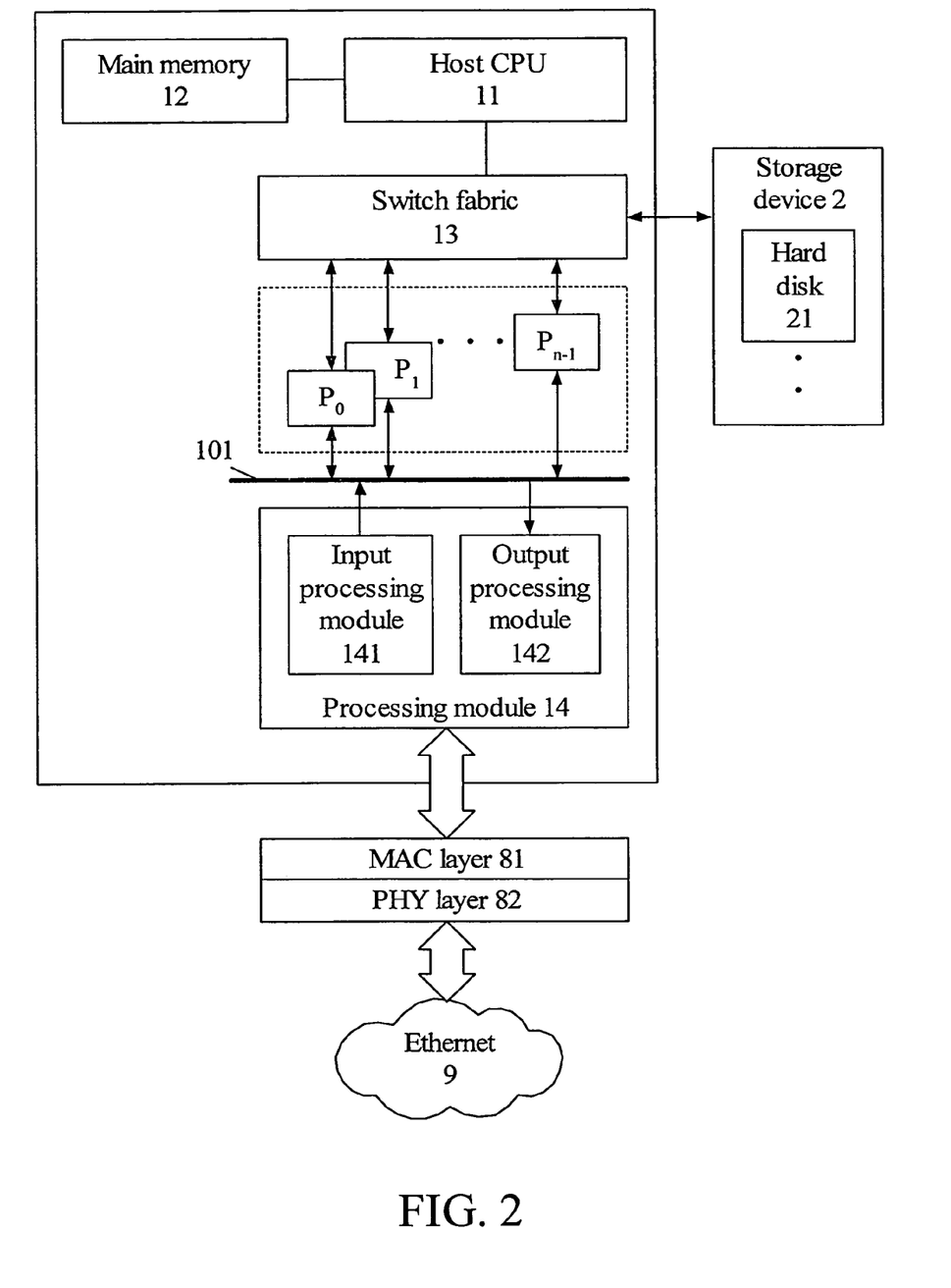
FIG. 2 is a system functional block drawing of the embodiment according to the present invention.

Please refer to FIG. 2. FIG. 2 is a system functional block drawing of the embodiment according to the present invention. A storage structure of the embodiment comprises a host CPU 11, a main memory 12, a switch fabric 13, a host bus adapter module, and a storage device 2, which are all connected to a bus 101. The host bus adapter module is an iSCSI HBA, which comprises a plurality of protocol processor nodes $P_0, P_1, \ldots, P_{n-1}$ and integrates with the processing module 14 to combine software and special hardware means for assignment and high speed protocol processing loads. Every protocol processor node is a processor or a controller, which is used for simultaneously processing protocol data units (PDUs) and transmission control protocol/internet protocol (TCP/IP) frames. A protocol processor node of the embodiment primarily processes frames and their commands contained in the connection established by at least one session. Of importance is that if one processor or controller is capable of executing many iSCSI PDUs or TCP/IP frames at the same time, it also has many protocol processor nodes. The plurality of protocol processor nodes can be integrated onto one chip, or the protocol processor nodes and the processing module 14 can all be integrated onto the same chip, or all functions can be designed into a single chip. A hard disk 21 of the storage device 2 can be a redundant array of independent disks (RAID) or other equal storage device.

Figure 3:
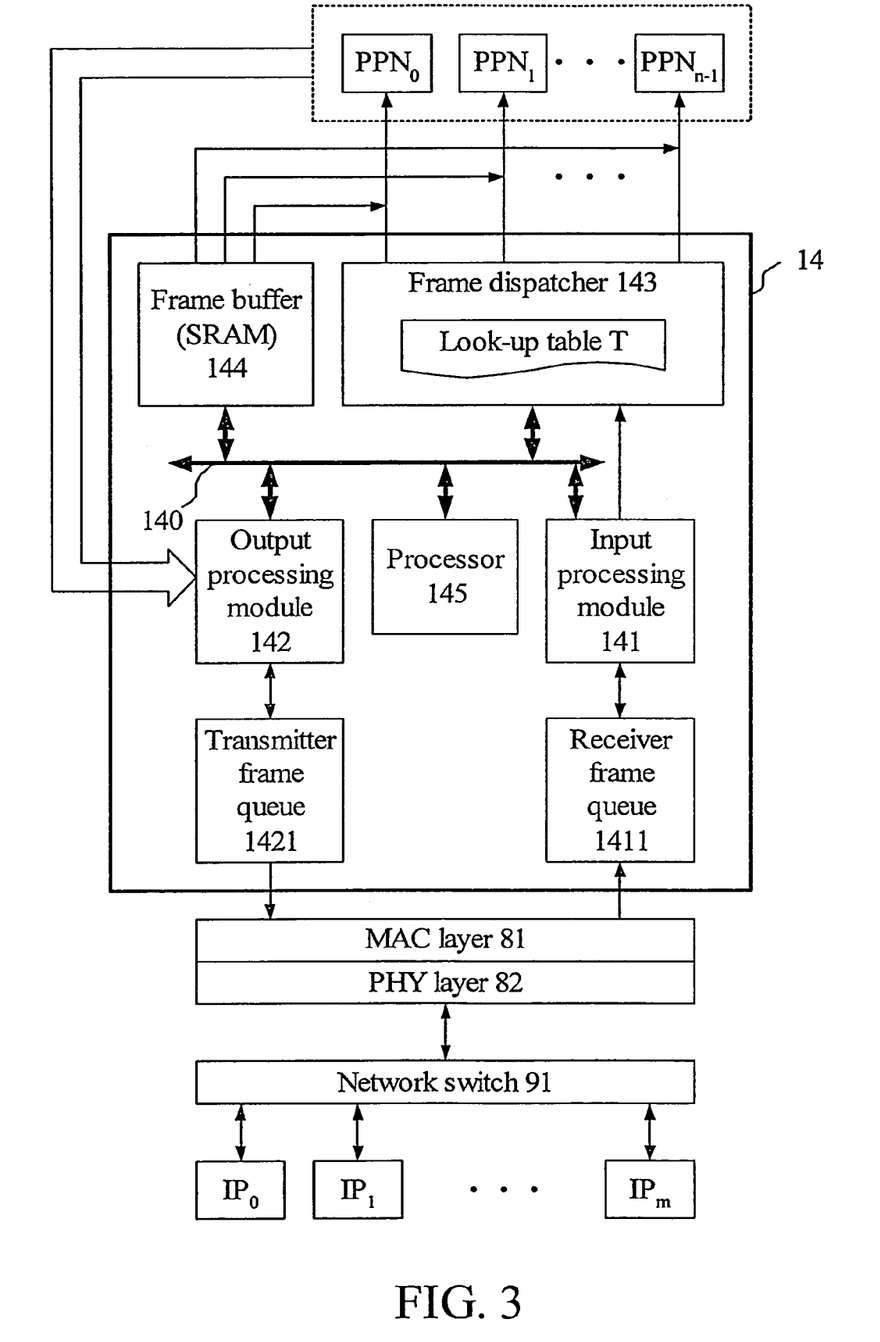
FIG. 3 is a detailed functional block drawing of a processing module of the embodiment according to the present invention.

Please refer to FIG. 3. FIG. 3 is a detailed functional block drawing of a processing module of the embodiment according to the present invention. The processing module 14 comprises an input processing module, (IPM) 141, an output processing module (OPM) 142, a frame dispatcher 143, a frame buffer 144, and a processor 145, which are all connected to a bus 140. Furthermore, a receiver frame queue 1411 and a transmitter frame queue 1421 are used for temporarily storing unsent frames; the frame buffer 144 can be SRAM or other equivalent storage medium; the processor 145 is used as a data structure controller in an application specific integrated circuit (ASIC); the frame dispatcher 143 utilizes a look-up table T. The frame dispatcher 143 is a hardware means for looking into the look-up table T and dispatching corresponding protocol processor nodes for processing each frame.

Figure 4:
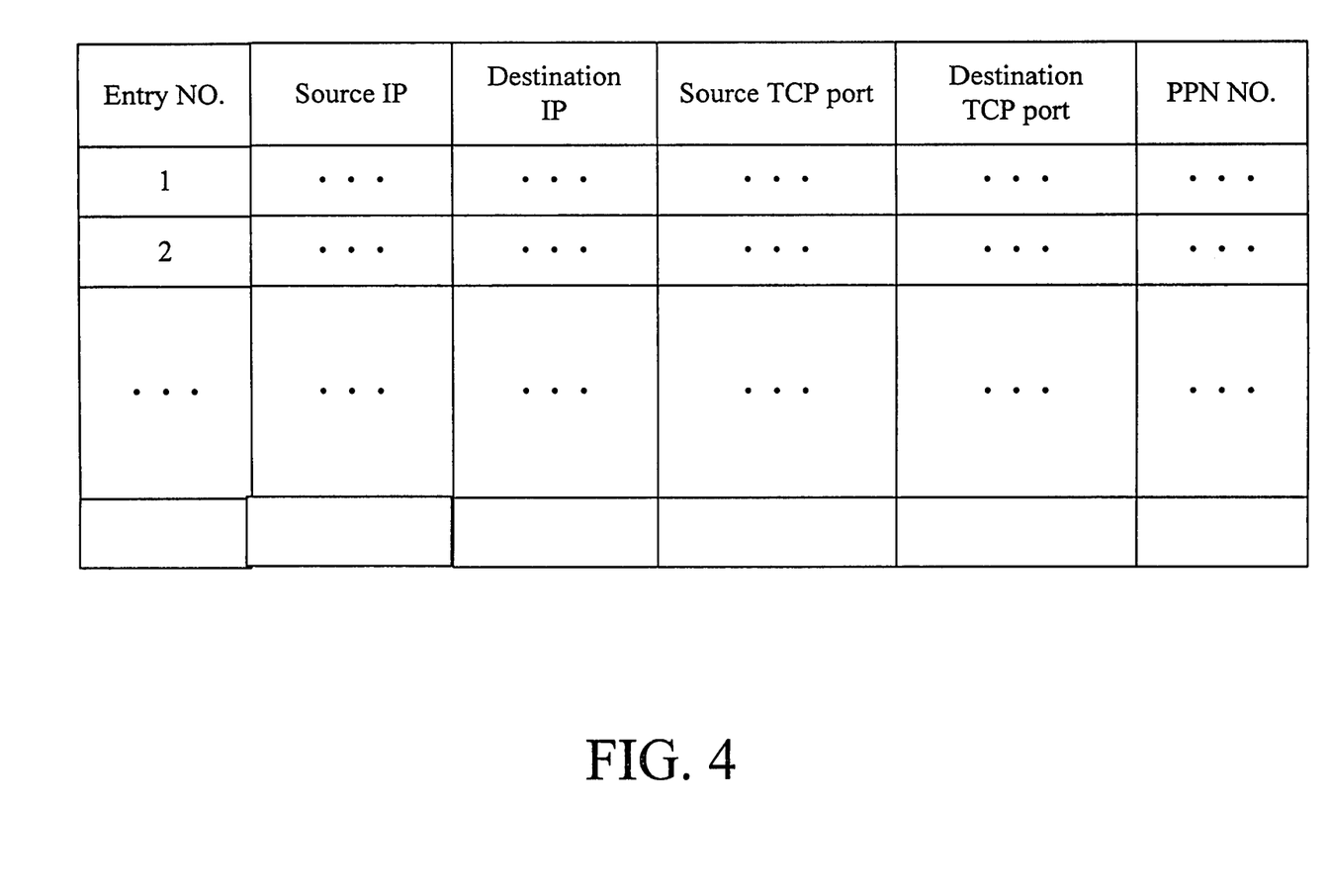
FIG. 4 is a schematic drawing of a look-up table of the embodiment according to the present invention.

As shown in FIG. 4, an entry in the look-up table T causes a corresponding protocol processor node to be dispatched according to a source IP address, source TCP port, destination IP address and destination TCP port corresponding to each frame. In this look-up table T, each entry includes the fields of source IP address, source TCP port, destination IP address, destination TCP port and PPN number, which represent a current iSCSI connection. In order to reduce the amount of data caused by a session state exchanged between PPNs, all connections of the same session are preferably processed by the same PPN. Since at least one session can be established between the nodes, and every session allows establishment of at least one connection, the look-up table T will respectively establish an entry for each independent connection, so as to assign a protocol processor node. Because each independent iSCSI connection uses different TCP/IP connection to transmit its iSCSI PDU, the input processing module 141 can refer to the look-up table T and dispatch the frame to the protocol processor node for splitting execution and iSCSI PDUs process according to the TCP/IP connection ID that corresponds to each frame. This TCP/IP connection ID is composed of source IP address, source TCP port, destination IP address and destination TCP port. The output processing module 142 is used for controlling output frames from all the protocol processor nodes, quality of service (QoS) and flow throughput.

Figure 5:
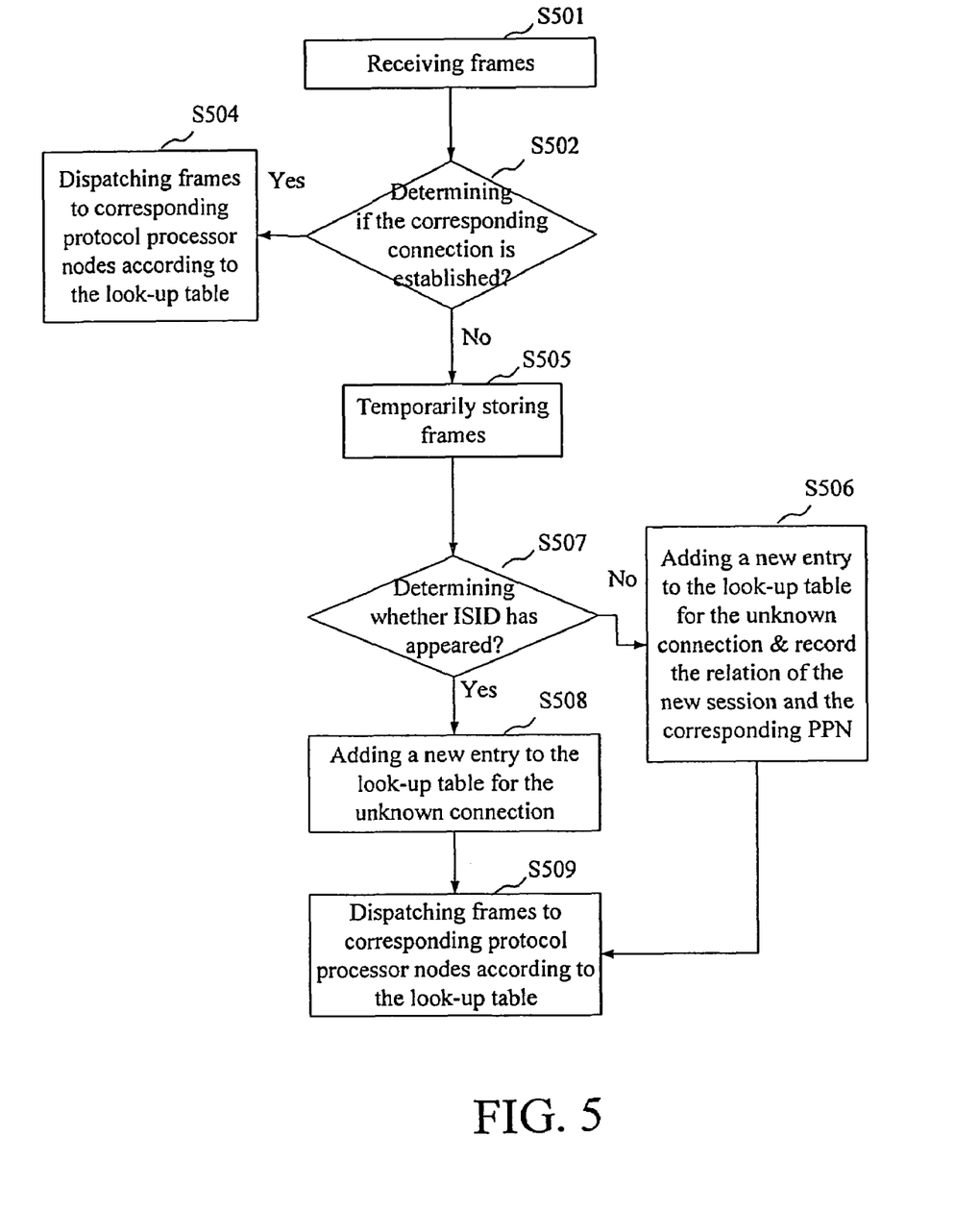
FIG. 5 is a flowchart of receiving and assigning frames of the embodiment according to the present invention.
Figure 6:
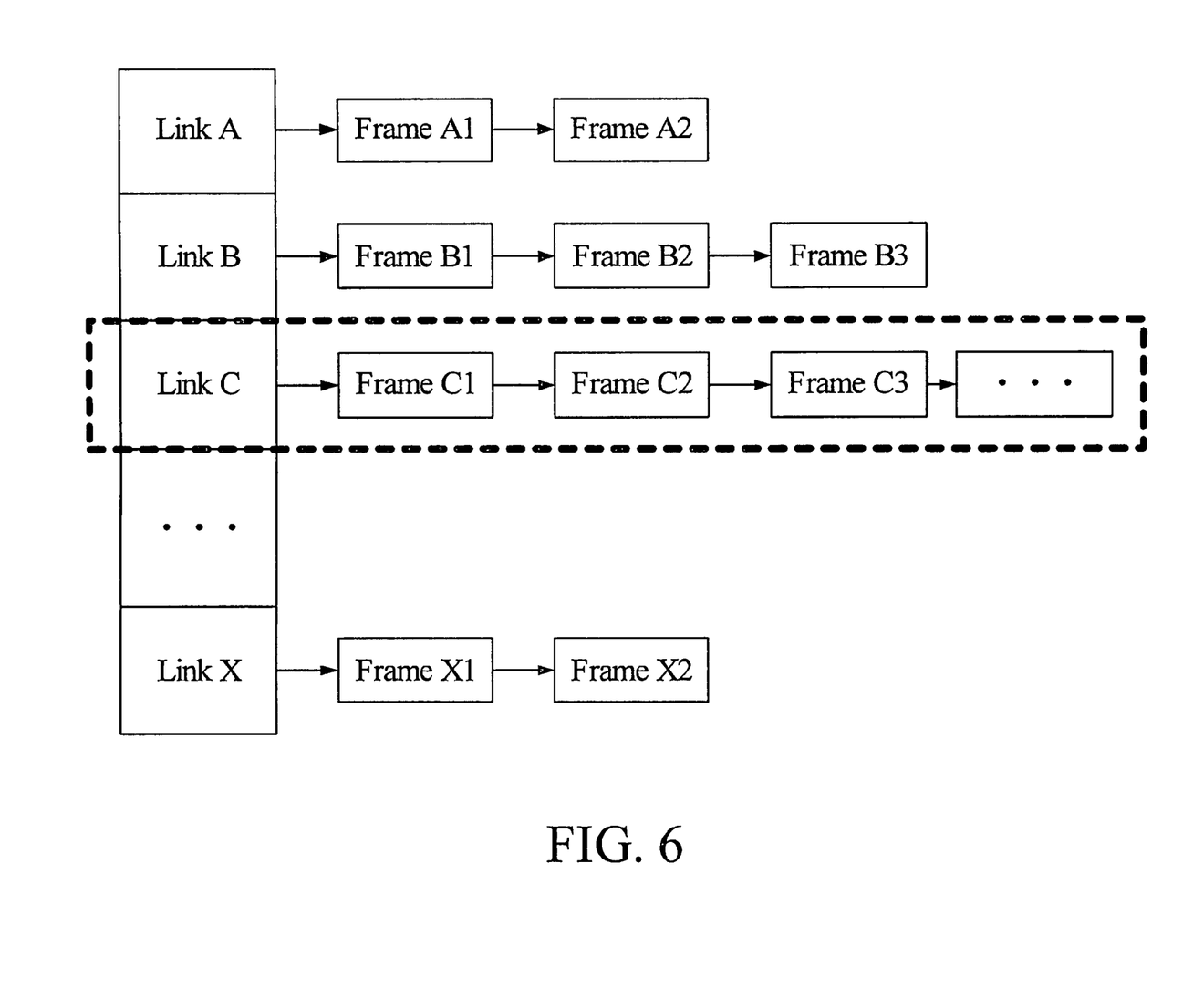
FIG. 6 is a schematic drawing of a link table data structure in a frame buffer of the embodiment according to the present invention.

Please refer to FIG. 3 and FIG. 5. When the frames sent from source ends $IP_0$ to $IP_m$ passes a medium access control (MAC) layer 81 via a network switch 91 (step S501), the frames sequentially wait for dispatching at the receiver frame queue 1411. Next, the frame dispatcher 143 sequentially extracts source IP address, source TCP port, destination IP address, destination TCP port information in the frames from the receiver frame queue 1411, to compare with source IP address, source TCP port, destination IP address and destination TCP port columns in the look-up table T (step S502). If they are matched, then this indicates that the look-up table T has established an entry for the source end of this frame, and the frame dispatcher 143 dispatches the frames to corresponding protocol processor nodes according to the look-up table T (step S504); otherwise, if the connection of the frame is an unknown connection and is not defined in the look-up table T, then this indicates that the frames came from various possible initiators and so they need to be processed. Therefore, the processor 145 temporarily stores the frames in the SRAM 144 (step S505), as shown in FIG. 6, and the frames of the unknown connections are preferably stored in the SRAM 144 as a link list data structure, and the frames belonging to the same connection are linked together.

A new entry is added to the look-up table T for an unknown frame (step S506 or S508), which assigns the protocol processor nodes for this frame. Of note is that while adding the new entry, an original process of the processor 145 is stopped, and the processor 145 determines if the format of the frame is a login protocol data unit; if it is, then a new entry is added to the look-up table T; otherwise the frame is abandoned.

If the look-up table T does not have an entry corresponding to the connection of the frame, the processor 145 determines whether the frame is a login PDU. If the frame is not a login PDU, the processor 145 discards this PDU. If the frame is a login PDU, the processor determines the Initiator Name of the frame and its ISID (step S507) so as to decide whether the session is existed. If the session has been established, the processor 145 establishes a new entry in the look-up table T (step S508). This entry is recorded with the source IP address, source TCP port, destination IP address and destination TCP port of the new connection associated with the PDU, and the PPN number associated with the session. Then, this frame is transmitted from the SRAM 144 to the corresponding protocol processor node (step S509) to enable the protocol processor node to execute the frame and its instructions. If the session has not yet been established, the processor 145 determines which one of the PPNs to process the new session associated with the new connection based on the load of each PPN. After determining the PPN to process the new session, the processor 145 records this new session and the corresponding data of the associated protocol processor node, and establishes a new entry in the look-up table T (step S506). The entry is recorded with the source IP address, source TCP port, destination IP address and destination TCP port information of the connection associated with the PDU, and the PPN number of the associated session. Then, this frame is transmitted from the SRAM 144 to the corresponding protocol processor node (step S509) to enable the protocol processor node to execute the frame and its instructions.

This embodiment can consider a session throughput dispatched to the protocol processor node, workflow throughput or even the operational capabilities of every protocol processor node for reference when dispatching frames to the protocol processor nodes when adding an entry into the look-up table T. Furthermore, when the columns of the look-up table are all filled to capacity, the processor 145 informs the receiver frame queue 1411 to stop receiving frames from new sessions. Furthermore, after the connection of a session has ended, the processor 145 removes the useless entry from the look-up table T to efficiently utilize the storage of the column in the look-up table T.

Figure 7:
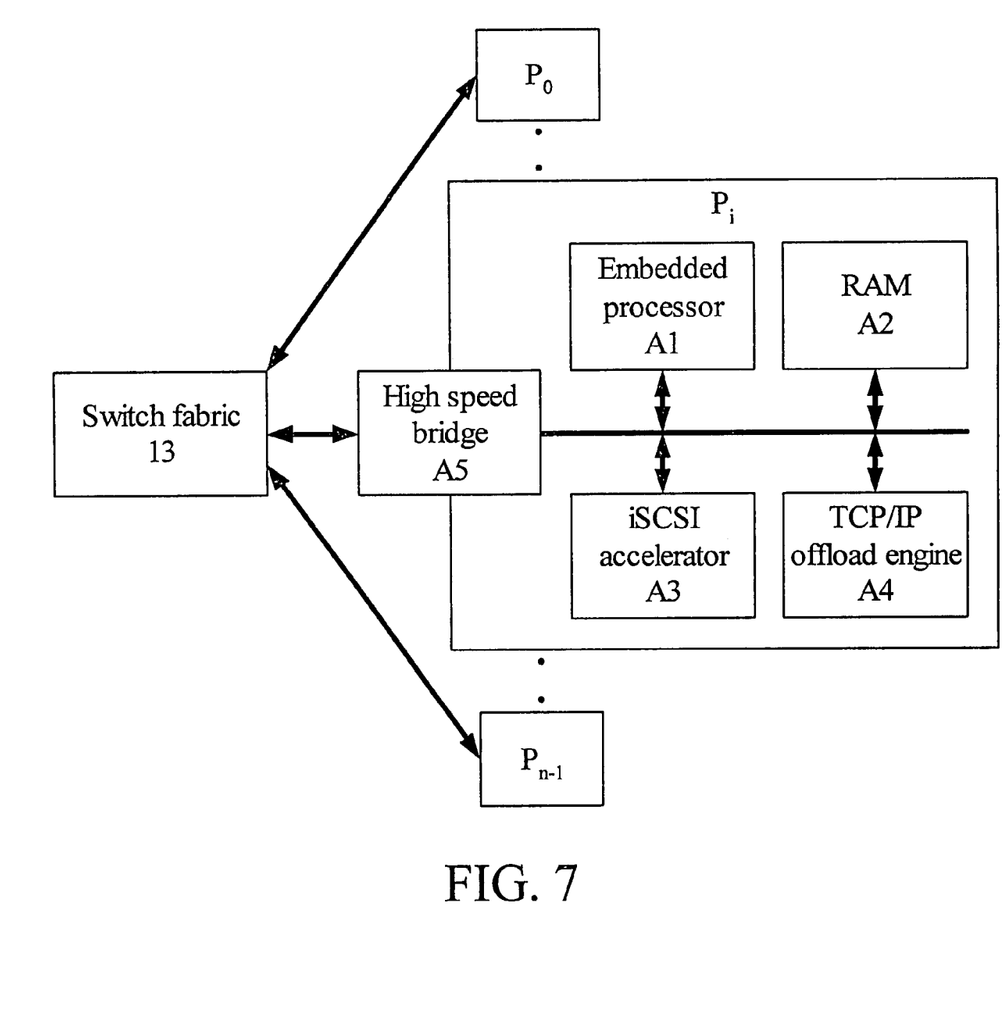
FIG. 7 is a functional block drawing of a plurality of protocol processor nodes of the embodiment according to the present invention.

Please refer to FIG. 7. FIG. 7 is a functional block drawing of a plurality of protocol processor nodes of the embodiment according to the present invention. A protocol processor node $P_i$ in the embodiment uses an embedded processor A1 as a core and connects to other devices on the bus to achieve frame movement and processing. The other devices include: local RAM A2 for providing temporary frame storage, an iSCSI accelerator A3, a TCP/IP offload engine A4 for hardware and a high speed bridge A5 for connection to the switch fabric 13. Of course, the above-mentioned devices can be added or removed according to actual protocol processor node requirements and the entire system hardware design. Every protocol processor node $P_i$ stores same program code to provide for processing of, for example, session operations, TCP/IP offload engine execution, iSCSI protocol processing, and iSCSI session control, and sends decoded SCSI commands to the hard disk 21 of the storage device 2 via the switch fabric 13. Furthermore, the protocol processor node $P_i$ can pack data, as required by SCSI commands, sent back from hard disk 21 as a frame to be sent by the output processing module 142.

When the hard disk 21 needs to send processed frames back to the network end via the protocol processor node, the output processing module 142 controls all frames output from the protocol processor node and sends the frames to the medium access control (MAC) layer 81 and physical (PHY) layer 82 to the network end according to a frame priority set by the QoS of the TCP/IP protocol. The output processing module 142 dispatches each protocol processor node according to a Round-robin principle; or the frames are all sorted by the iSCSI protocol to obtain the frame priority, and so the protocol processor node adds the priority definition tag to the frames and the output processing module 142 sends out frames according to the priority rankings.

Accordingly, the storage structure and method having multiple protocol processor units of the present invention is not limited to a system with one single high speed transmission port or multiple transmission ports. The present invention provides a transmission structure for a high speed transmission iSCSI storage apparatus, which uses multiple protocol processor nodes to increase the iSCSI HBA transmission speed. Since the present invention is module-based, it can utilize switch fabric technology to connect other units into the system. Furthermore, the present invention utilizes the look-up table to accelerate pre-processing speed of the package so that the frame can be quickly dispatched to a corresponding protocol processor node.

Although the present invention has been explained in relation to its preferred embodiment, it is to be understood that many other possible modifications and variations can be made without departing from the spirit and scope of the invention as hereinafter claimed.

What is claimed is:

1. A storage structure having multiple protocol processor units comprising:
    a host CPU;
    a main memory;
    a host bus adapter module comprising:
        a plurality of protocol processor nodes for processing frames and commands contained in connections established by at least one session; and
        a processing module comprising an input processing module, an output processing module and a processor, the input processing module capable of sending a frame sent from a network end to a corresponding protocol processor node for execution according to a look-up table, the output processing module capable of sending the frame sent from the protocol processor nodes to the network end;
    a storage device having at least one disk for storing data in the frame processed by the protocol processor nodes; and
    a switch fabric being a transform medium for the protocol processor nodes and the storage device, and for sending the data in the frame and commands sent by the protocol processor nodes to the storage device for storage and execution.

2. The storage structure as claimed in claim 1, wherein the input processing module further comprises a receiver frame queue, frame dispatcher and a frame buffer, the receiver frame queue being used for receiving a frame from the network end and dispatching the frame to a matching protocol processor node according to a session and the look-up table.

3. The storage structure as claimed in claim 2, wherein if the corresponding connection of the frame is an unknown connection undefined by the look-up table, the frame is temporarily stored in the frame buffer.

4. The storage structure as claimed in claim 3, wherein the processor of the processing module establishes a new entry for the connection corresponding to the frame in the look-up table, which is assigned for processing by the protocol processor node corresponding to the frame.

5. The storage structure as claimed in claim 3, wherein the frame is stored in the frame buffer as a data structure in a link table.

6. The storage structure as claimed in claim 2, wherein the frame buffer is SRAM.

7. The storage structure as claimed in claim 1, wherein the output processing module sends the frame to the network end according to a priority corresponding to each frame.

8. The storage structure as claimed in claim 7, wherein the output processing module sends each frame according to a Round-robin rule.

9. The storage structure as claimed in claim 7, wherein the output processing module sorts a priority of each frame according to an internet small computer system interface (iSCSI) protocol.

10. The storage structure as claimed in claim 1, wherein the host bus adapter module is a host bus adapter card of an internet small computer system interface.

11. The storage structure as claimed in claim 1, wherein the protocol processor nodes are disposed on a chip.

12. The storage structure as claimed in claim 1, wherein the protocol processor nodes and the processing module are disposed on a chip.

13. The storage structure as claimed in claim 1, wherein each protocol processor node further comprises a processor, RAM, and a bridge for providing a high speed connection with the switch fabric.

14. The storage structure as claimed in claim 1 being applied in an Ethernet environment.

15. A storage method utilizing multiple protocol processor units comprising:
   a receiving step for receiving a frame and its command contained in a connection established by at least one session sent from a network end;
   an assigning step for sending the frame to a corresponding protocol processor node according to a look-up table;
   a storing step for storing the frame and the command transformed by a switch fabric into a storage device; and
   an outputting step for sending the frame sent by the protocol processor node to the network end.

16. The storage method as claimed in claim 15, wherein in the assigning step, if the corresponding connection of the frame is an unknown connection undefined by the look-up table, the frame is temporarily stored in the frame buffer.

17. The storage method as claimed in claim 16 further comprising establishing a new entry for the connection corresponding to the frame in the look-up table, which is assigned for processing the protocol processor node corresponding to the frame.

18. The storage method as claimed in claim 16, wherein the frame is stored in the frame buffer as a data structure in a link table.

19. The storage method as claimed in claim 15, wherein the outputting step comprises sending the frame to the network end according to a priority corresponding to each frame.

20. The storage method as claimed in claim 19, wherein the output step comprises sending each frame according to a Round-robin rule.

21. The storage method as claimed in claim 19 further comprising sorting a priority of each frame according to an internet small computer system interface (iSCSI) protocol.

22. The storage method as claimed in claim 15, wherein each session is used for establishing at least one connection, and the look-up table separately establishes an entry for each connection corresponding to the same session and assigns the entry to the corresponding protocol processor node.

23. The storage method as claimed in claim 15, wherein if a storage column of the look-up table is full, the frame sent by a new session is rejected.

24. The storage method as claimed in claim 15, wherein if the session stops the connection, the corresponding entry in the look-up table is removed.

* * * * *